United States Patent
Sanyal et al.

(10) Patent No.: US 12,113,886 B2
(45) Date of Patent: Oct. 8, 2024

(54) METHODS, SYSTEMS AND COMPUTER READABLE MEDIA FOR GENERATING DYNAMIC TIME ERROR

(71) Applicant: Keysight Technologies, Inc., Santa Rosa, CA (US)

(72) Inventors: Jeeyan Sanyal, North 24 Parganas (IN); Noah Steven Gintis, Westlake Village, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/105,231

(22) Filed: Feb. 2, 2023

(65) Prior Publication Data

US 2024/0267196 A1    Aug. 8, 2024

(51) Int. Cl.
*H04L 7/00* (2006.01)

(52) U.S. Cl.
CPC .......... *H04L 7/0016* (2013.01); *H04L 7/0062* (2013.01)

(58) Field of Classification Search
CPC .................................................. H04L 7/0016
See application file for complete search history.

(56) References Cited

U.S. PATENT DOCUMENTS

| | | | |
|---|---|---|---|
| 11,212,024 B2 | 12/2021 | Bordogna et al. | |
| 2019/0319729 A1 | 10/2019 | Leong et al. | |
| 2021/0203428 A1* | 7/2021 | Bordogna | H04J 3/0697 |
| 2022/0060310 A1* | 2/2022 | Arai | H04L 45/3065 |
| 2023/0076512 A1* | 3/2023 | Matsushita | H04L 7/0016 |

FOREIGN PATENT DOCUMENTS

EP    3334067 A1    6/2018

OTHER PUBLICATIONS

Maghdid, et al., "Dynamic Clock-Model of Wi-Fi Access-Points to help plndoors Localisation of Smartphones", IV International Congress on Ultra Modern Telecommunications and Control Systems, pp. 268-273 (2012).
Ixia, "Testing PTP/IEEE On-Path Support Devices", Jan. 2014, https://support.ixiacom.com/sites/defualt/files/resources/whitepaper/OnPath-Testing.pdf.
Cook, "Measuring Time Error", Calnex, 2014 http://www.telecom-sync.com/files/pdfs/itsf/2014/Day3/1310-tommycook_calnex.pdf.
"AN 739: Altera 1588 System Solution", 2016, https://www.intel.com/content/www/us/en/docs/programmable/683410/current/altera-1588-system-solution.html.
"Compensation Considerations for PTP Time Errors in VSC 1588 PHY's", Jan. 2021 https://microchipsupport.force.com/s/article/Compensation-Considerations-for-PTP-Time-Errors-in-VSC-1588-PHY-s.

(Continued)

*Primary Examiner* — Kristie D Shingles

(57) ABSTRACT

The subject matter described herein includes methods, systems, and computer readable media for generating DTE. One method for generating DTE includes at a test device for testing a timing device: configuring, using configuration information, a timestamp impairment engine for generating DTE values for transmit timestamps, wherein the timestamp impairment engine utilizes a sine wave based formula to generate the DTE values; generating a packet comprising an impaired transmit timestamp, wherein the impaired transmit timestamp is generated using a non-impaired timestamp and a DTE value generated by the timestamp impairment engine; and sending the packet to the timing device.

16 Claims, 5 Drawing Sheets

(56) References Cited

OTHER PUBLICATIONS

"The Dedicated Synchronization Tester: Now with 5G Over-the-Air Measurements", Calnex Sentinel, 2021, https://calnexsol-jp.com/docman/datasheet/603-sentinel-datasheet/file.
Paragon-ONE, Calnex, pp. 1-2 (2022), https://www.calnexsol.com/en/product-detail/1036-paragon-one.
Paragon-neo, Calnex, pp. 1-2 (2022), https://www.calnexsol.com/en/product-detail/1295-paragon-neo-4.
"Solve the Timing Challenges of 5G", Calnex Paragon-neo, Calnex Solutions, pp. 1-4 (Oct. 2022).
"Prove Ethernet Sync to 10 GbE", Calnex Solutions, pp. 1-6 (Jun. 2022).
"A Method to Extract Time Error Samples from Precision Time Protocol (PTP) Packet Capture for Clock Quality Analytics", IP.com, Pub Id. IPCOM000267003D (Sep. 14, 2021).
"Methodology of Injecting Time Error and Measuring Its Impact on a Time Aware Shaper Implementation", IP.com, Pub Id. IPCOM000263992D (Oct. 29, 2020).

* cited by examiner

METHODS, SYSTEMS AND COMPUTER READABLE MEDIA FOR GENERATING DYNAMIC TIME ERROR

TECHNICAL FIELD

The subject matter described herein relates to testing timing devices. More particularly, the subject matter described herein relates to methods, systems, and computer readable media for generating dynamic time error (DTE).

BACKGROUND

In time sensitive networks, such as IEEE 1588 compatible networks, the timing of packets is critical to applications. For example, a machine in a factory may be instructed to take a certain action at a specified time that corresponds to a part being present at the machine. If the time used by the machine is not synchronized with the time of the controller sending the instruction, the machine may act too early or too late, and damage to the part and/or injury to humans operating the machine can result. Time sensitive network standards, such as IEEE 1588, ensure time synchronization between computing platforms so that actions can be coordinated. For example, time sensitive networks may utilize a timing and synchronization protocol, such as precision time protocol (PTP), to generate and send timing and synchronization packets with packet transmit timestamps and may rely on these packets and related calculations of packet transmit time to achieve synchronization.

In real-world networks, packet delay variation (e.g., variation of the delay in packet arrival time) may be caused by various factors, e.g., network congestion, queuing effects, QoS, etc. PDV can introduce some amount of error in synchronization of PTP devices since PTP relies on time intervals between packets for frequency recovery. However, transmit timestamps recorded within PTP packets are not affected by PDV.

Transmit timestamps in PTP may be generated by an internal clock of a timing device, and in real-world scenarios, due to the inaccuracies of clocks, time error (TE) may be introduced in the generated timestamps. TE can be classified into 2 categories, constant TE (CTE) and dynamic TE (DTE). The DTE may vary as a function of real time. The amount of TE generated by clocks generally varies according to clock class and network devices have to compensate for this TE, and therefore it becomes imperative to test and validate these compensation techniques.

Some test systems may emulate a timing and synchronization protocol (e.g., PTP, ethernet synchronization message channel (ESMC), etc.) for testing negotiation of timing devices and maintaining synchronization of follower timing devices with the emulated protocol. Some test solutions may allow a tester to add a fixed (e.g., static) offset in transmit packet timestamps (e.g., CTE), so that the timestamps are always ahead, or behind the real time by a fixed amount. Some test solution may also offer tools for measuring TE in clock devices (e.g., to confirm whether the devices are compliant with standards). However, such test systems do not address realistic impairment of timestamps caused by TE seen in real-world networks.

Accordingly, there exists a need for methods, systems, and computer readable media for generating DTE.

SUMMARY

The subject matter described herein includes methods, systems, and computer readable media for generating dynamic time error (DTE). One method for generating DTE includes at a test device for testing a timing device: configuring, using configuration information, a timestamp impairment engine for generating DTE values for transmit timestamps, wherein the timestamp impairment engine utilizes a sine wave based formula to generate the DTE values; generating a packet comprising an impaired transmit timestamp, wherein the impaired transmit timestamp is generated using a non-impaired timestamp and a DTE value generated by the timestamp impairment engine; and sending the packet to the timing device.

One system for generating DTE includes a test device implemented using at least one processor and the memory. The test device is for testing a timing device and is configured for: configuring, using configuration information, a timestamp impairment engine for generating DTE values for transmit timestamps, wherein the timestamp impairment engine utilizes a sine wave based formula to generate the DTE values; generating a packet comprising an impaired transmit timestamp, wherein the impaired transmit timestamp is generated using a non-impaired timestamp and a DTE value generated by the timestamp impairment engine; and sending the packet to the timing device.

The subject matter described herein for generating DTE may be implemented in hardware, software, firmware, or any combination thereof. As such, the terms "function" or "module" as used herein refer to hardware, software, and/or firmware for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Reference will now be made in detail to various embodiments of the subject matter described herein, examples of which are illustrated in the accompanying drawings. Wherever possible, the same reference numbers will be used throughout the drawings to refer to the same or like parts.

Figure 1:
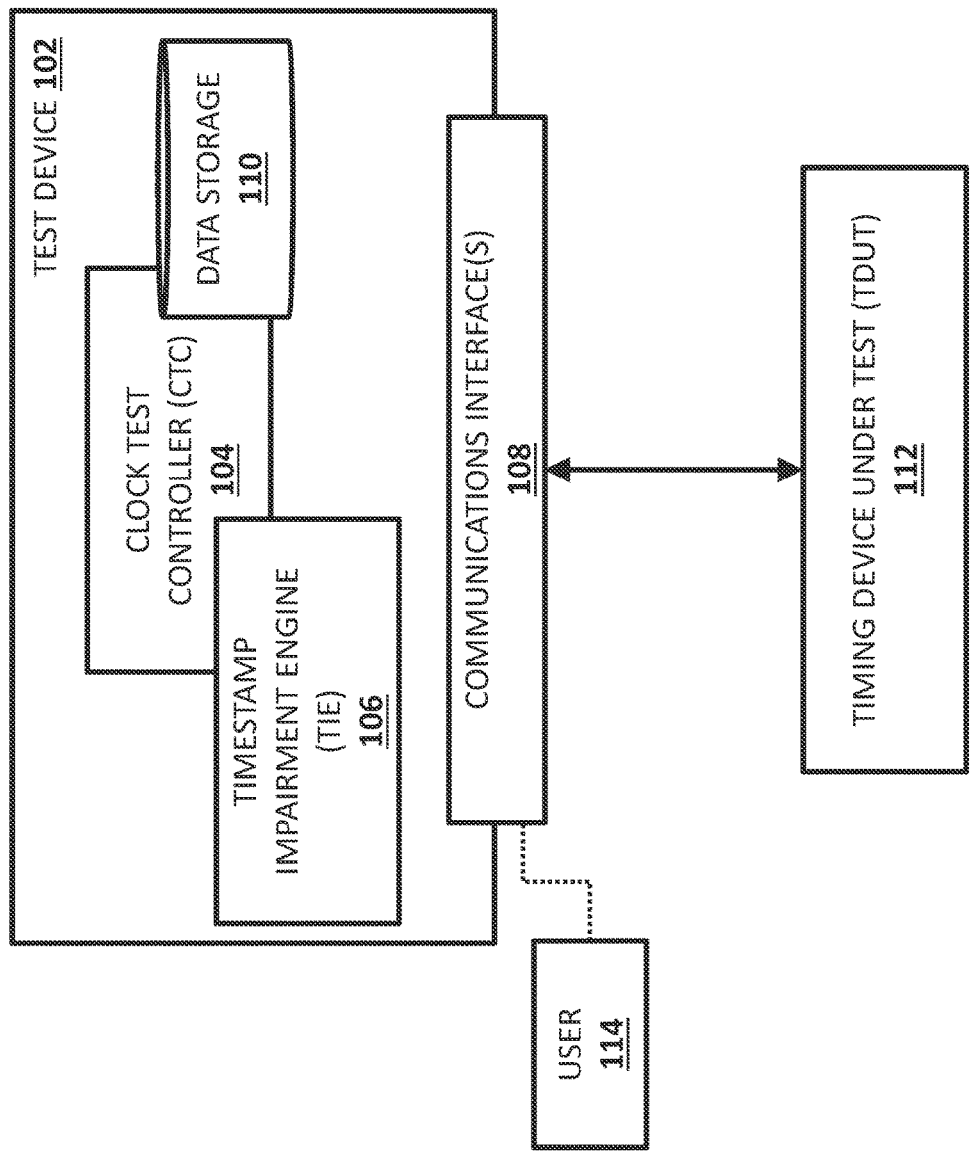
FIG. 1 is a network diagram illustrating an example system for generating dynamic time error (DTE)

FIG. 1 is a network diagram illustrating an example system 100 for generating DTE. Referring to FIG. 1, test system 100 may include a test device 102 for testing a timing device under test (TDUT) 112, e.g., a timing device, a follower clock device, etc. In some embodiments, test device 102 or a related entity may be configured by or may interact with a user 114, e.g., a test operator or a management entity.

Test device 102 may represent any suitable entity (e.g., one or more computing platforms or a testing tool implemented using at least one processor) for performing various aspects associated with testing TDUT 112.

Test device 102 may include at least one processor and memory. Test device 102 may include various modules or other entities that utilize the at least one processor and memory. In some embodiments, test device 102 may include a clock test controller (CTC) 104, a timestamp impairment engine (TIE) 106, one or more communications interface(s) 108, and data storage 110.

CTC 104 may represent any suitable entity or entities (e.g., software implemented using at least one processor, a field-programmable gate array (FPGA), an application-specific integrated circuit (ASIC), or a combination of software, an ASIC, or an FPGA) for performing one or more aspects associated with testing TDUT 112 and/or various aspects thereof. In some embodiments, CTC 104 may be implemented using one or more processors and/or memory. In some embodiments, CTC 104 may include modules or functionality for acting as an IEEE 1588 master node in a time synchronization process. For example, during a test session, CTC 104 may initiate a time synchronization process, where CTC 104 emulates or uses a master clock signal and/or TIE 106 for generating impaired transmit timestamps in PTP messages or other timing and synchronization protocol messages. In another example, CTC 104 may be configured to send test packets (e.g., PTP messages or other timing messages) to TDUT 112 during a time synchronization process or other timing process. In this example, CTC 104 may utilize TIE 106 or related functionality to generate and include impaired timestamps (e.g., by adding realistic DTE and, optionally, CTE) in one or more test packets.

In some embodiments, CTC 104 may collect or obtain statistics or test results from one or more sources (e.g., local memory, TDUT 112, an intermediate switch, data storage 110, etc.) and may analyze the information to determine how TDUT 112 performed during testing. For example, CTC 104 may obtain a timing log indicating how an internal clock of TDUT 112 responded to testing (e.g., a PTP-based time synchronization process). In this example, after analyzing test results or related data, test device 102 or a related entity (e.g., CTC 104) may provide a test report and/or diagnostics report to user 114 or another entity for review and/or further actions.

TIE 106 may represent any suitable entity or entities (e.g., software implemented using at least one processor, an FPGA, an ASIC, or a combination of software, an ASIC, or an FPGA) for performing one or more aspects associated with DTE generation and/or timestamp impairment. In some embodiments, TIE 106 may be implemented using one or more processors and/or memory. For example, TIE 106 may generate DTE values that are sinusoidal over time and may use the DTE values to impair timestamps. In this example, TIE 106 may utilize a sine wave based formula having configurable variables, e.g., an sine wave amplitude, a sine wave frequency, and a duration of impairment value.

In some embodiments, TIE 106 may provide a user interface or API for receiving configuration information (e.g., DTE generation related settings) from user 114 for impairing timestamps. In some embodiments, TIE 106 may provide a user interface or API for receiving input criteria to generate an impaired timestamp (e.g., a timestamp modified by a DTE value generated by TIE 106.) For example, TIE 106 may provide an API that takes as input a base timestamp (e.g., the correct time or a non-impairment timestamp) to be impaired, and returns an timestamp impaired by a realistic DTE value (e.g., a base timestamp +/−DTE).

Communications interface(s) 108 may represent any suitable entities (e.g., network interface cards (NICs), port modules, and/or other hardware or software) for receiving and sending communications via various communications protocols and/or data formats. For example, communications interface(s) 108 may include a user interface (UI), a graphical UI (GUI), and/or an application programming interface (API) for allowing user 114 or another entity to provide configuration information and/or interact with test system 100, e.g., test device 102 CTC 104, and/or TIE 106.

Data storage 110 may represent any suitable entity (e.g., a computer readable medium, a database, a storage device, or memory) for storing configuration information, DTE generation formulas, timestamp impairment algorithms, TIE state information, TIE processing mode behaviors, test results, test statistics, and/or other data.

TDUT 112 may be any suitable entity or entities (e.g., devices, systems, or platforms or software executing on one or more processors) for receiving, processing, forwarding, and/or sending one or more timing messages (e.g., packets). In some embodiments, TDUT 112 may represent a clock device or a timing device. For example, TDUT 112 may be an IEEE 1588 slave clock or node configured to synchronize its internal clock or time with an IEEE 1588 master clock or node. In this example, TDUT 112 may have various logic for handling TE or other issues involved with time synchronization or other timing related processes.

User 114 may be any entity (e.g., an automated system or a device or system controlled or controllable by a human user) for selecting, viewing, and/or configuring various aspects associated with test device 102 or test system 100. For example, user 114 may provide configuration information to test device 102 via communications interface(s) 108. Example UIs for interacting with test device 102 or elements in test system 100 may support automation (e.g., via one or more scripting languages), a representation state transfer (REST) API, a command line, and/or a web based GUI.

It will be appreciated that FIG. 1 is for illustrative purposes and that various depicted entities, their locations, and/or their functions described above in relation to FIG. 1 may be changed, altered, added, or removed.

Figure 2:
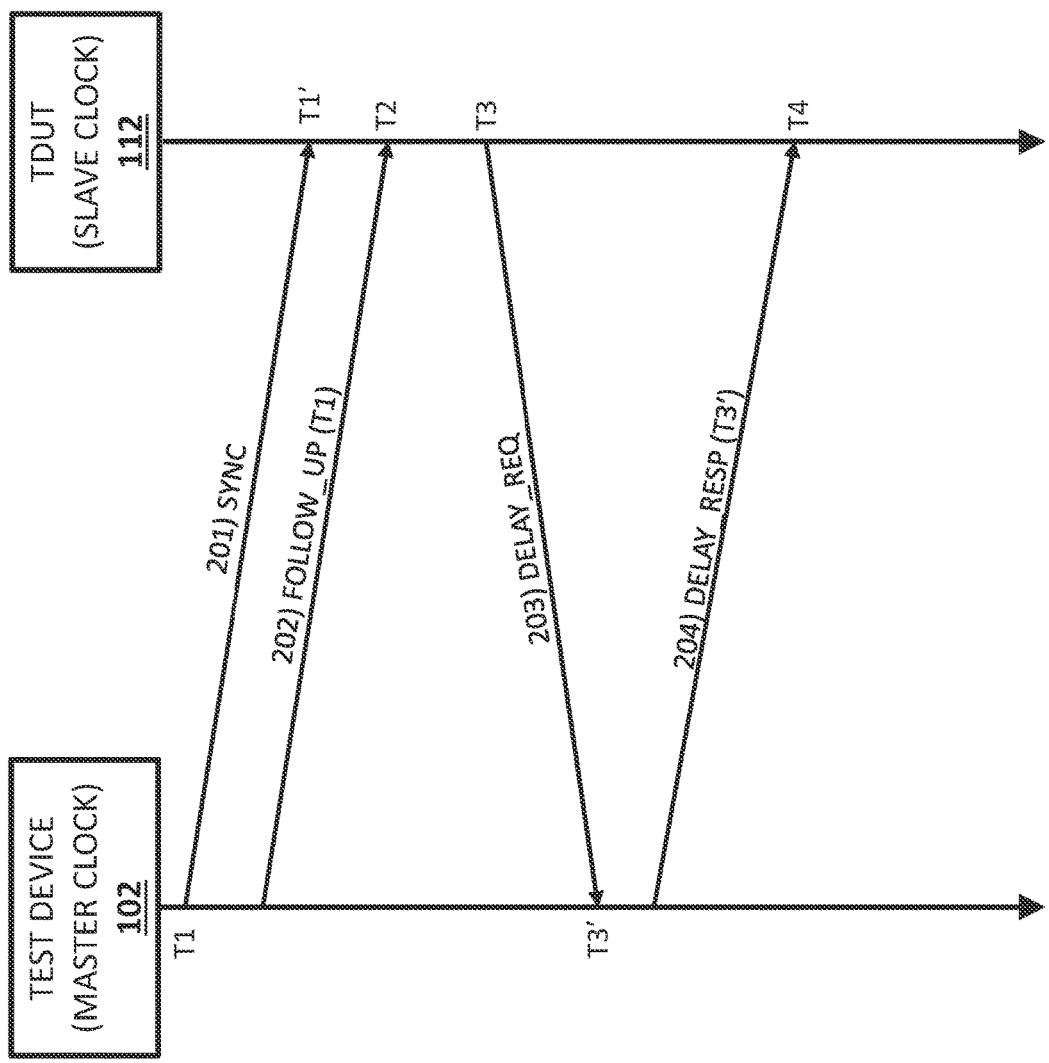
FIG. 2 is a message flow diagram illustrating a time synchronization process using precision time protocol (PTP) messages.

FIG. 2 is a message flow diagram illustrating a time synchronization process 200 using PTP messages (e.g., as defined in IEEE 1588). Referring to FIG. 2, test device 102 or a related entity (e.g., CTC 104 and/or TIE 106) may be configured to emulate a master or leader clock device (e.g., an IEEE 1588 master clock or node) for sending PTP timing packets or messages for allowing a slave or follower clock device (e.g., an IEEE 1588 slave clock or node) to synchronize its internal clock. For example, test device 102 or a related entity may test aspects of TDUT 112, including its ability to perform time synchronization via a PTP protocol (or another timing protocol) and/or its ability to handle TE (e.g., DTE and/or CTE) when performing time synchronization or other timing related processes.

In some embodiments, test device 102 may act as a master source of time that periodically sends messages containing a timestamp to TDUT 112. In such embodiments, test device 102 or a related entity (e.g., CTC 104 and/or TIE 106) may use a master clock signal or an emulation thereof to generate a timestamp and to impair the timestamp with realistic DTE and, optionally, with CTE.

In some embodiments, TDUT 112 may be configured to act as a slave clock device or a follower clock device and to use the received timestamps in synchronizing its clock with the master clock or time source provided by test device 102. For example, TDUT 112 may use a timestamp from test device 102 to determine an offset or difference between its clock signal and a master clock signal of test device 102 in order to accurately synchronize its clock signal to the master clock signal. In this example, the accuracy of the timestamps in received PTP messages may have a significant on the accuracy of the synchronization between the master and slave clock signals.

In some embodiments, when testing TDUT 112, test device 102 may send impaired timestamps (e.g., by adding or controlling DTE in such timestamps) to test various aspects of TDUT 112, e.g., resiliency, error behaviors, and/or precision.

Referring to time synchronization process 200, in step 201, a PTP Sync message may be sent from test device 102 to TDUT 112. In some embodiments, when TDUT 112 receives a PTP Sync message, TDUT 112 may record a local timestamp T1' (e.g., timestamp T1'=145 ms) indicating when the PTP Sync message was received by TDUT 112.

In step 202, a PTP Follow_Up message may be sent from TDUT 112 to test device 102 and may include a timestamp T1 indicating when the PTP Synch message was sent by test device 102. In some embodiments, a timestamp in the PTP Follow_Up message may be impaired or modified by DTE (e.g., a DTE value generated by test device 102 or TIE 106). For example, test device 102 may generate a realistic DTE value and add the DTE value to an accurate or non-impaired timestamp indicating when a PTP Synch message was sent by test device 102 and may send the impaired timestamp (e.g., timestamp T1=160 ms) in a PTP Follow_Up message.

In some embodiments, when TDUT 112 receives a PTP Follow_Up message, TDUT 112 may record a local timestamp T2 indicating when the PTP Follow_Up message was received. In such embodiments, TDUT 112 may compute a time offset by subtracting timestamp T1' from T1 (e.g., 160 ms-145 ms=15 ms) and then add the offset to the current local time to generate a new synchronized local time (e.g., timestamp T2+offset=new_sync_local_time).

In some embodiments, test device 102 or a related entity may emulate a clock device or time source that can generate and include timestamp T1 in a PTP Sync Message. In such embodiments, a PTP Follow_Up message may not be needed to provide timestamp T1 from test device 102 to TDUT 112.

In step 203, a PTP Delay_Req message may be sent from TDUT 112 to test device 102 and may be usable for determining delay (e.g., a propagation delay or a one-way delay) between TDUT 112 and test device 102. In some embodiments, determining a one-way delay may be useful in synchronizing with a time source. In some embodiments, TDUT 112 may record a local timestamp T3 (e.g., timestamp T3=190 ms) indicating when the PTP Delay_Req message was sent by TDUT 112.

In step 204, a PTP Delay_Resp message may be sent from test device 102 to TDUT 112 and may include a timestamp T3' indicating when the PTP Delay_Req message was received by test device 102. In some embodiments, a timestamp (e.g., timestamp T3') in the PTP Delay_Resp message may be impaired or modified by DTE (e.g., a DTE value generated by test device 102 or TIE 106). For example, test device 102 may generate a realistic DTE value and add the DTE value to an accurate or non-impaired timestamp indicating when a PTP Delay_Req message was received by test device 102 and may send the impaired timestamp (e.g., timestamp T3'=194) in a PTP Delay_Req message.

In some embodiments, when TDUT 112 receives a PTP Delay_Resp message, TDUT 112 may record a local timestamp T4 indicating when the PTP Delay_Resp message was received. In such embodiments, TDUT 112 may compute a one way delay by subtracting timestamp T3 from timestamp T3' and dividing the result by 2 (e.g., (194 ms-190 ms)/2=2 ms) and then add the delay to the current local time to generate a new synchronized local time (e.g., timestamp T4+one_way_delay=new_sync_local_time).

It will be appreciated that FIG. 2 is for illustrative purposes and that various depicted messages and details for testing TDUT 112 or timing synchronization aspects described above in relation to FIG. 2 may be changed, altered, added, or removed.

Figure 3:
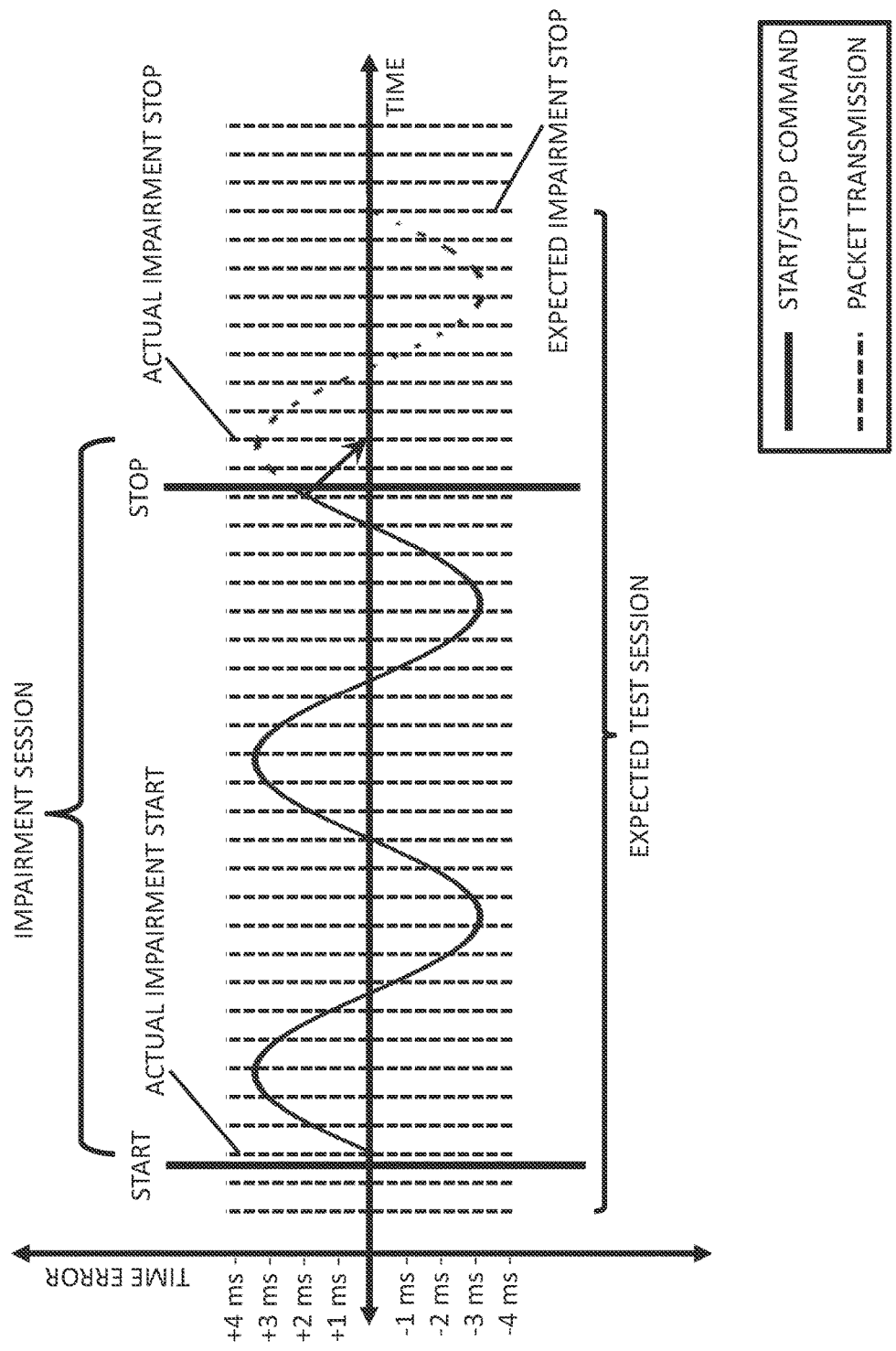
FIG. 3 is a diagram illustrating example sinusoidal DTE values.

FIG. 3 is a diagram 300 illustrating example sinusoidal DTE values that may be generated by TIE 106 or a similar entity. Referring to diagram 300, transmitted packets are depicted as dotted vertical lines, DTE values at various points in time (e.g., generated based on a configurable sine wave based formula) are depicted as a sine wave, and start and stop commands are depicted as thick, solid vertical lines.

In some embodiments, TIE 106 or a related entity may be configured (e.g., by user 114) for a test session where TIE 106 or a related entity is utilizing a sine wave based formula to generate realistic DTE values (e.g., at least for a timestamp impairment portion of the test session). For example, a test session may involve test device 102 testing TDUT 112 by sending timing test packets with timestamps. In this example, as depicted in FIG. 3, an expected test session (e.g., as configured by user 114) may indicate a test session with a timestamp impairment portion. In this example, during the timestamp impairment portion of the test session, the impairment portion may be configured to end after a predetermined number of sine wave cycles is reached (e.g., three cycles).

In some embodiments, TIE 106 or a related entity may provide an API or other interface to receive and register user provided commands, such as a 'start' command for starting timestamp impairment or a 'stop' command for stopping timestamp impairment. In such embodiments, TIE 106 or a related entity may be configured to handle commands in an appropriate manner so as not to trigger or cause error events at TDUT 112, e.g., a loss of synchronization error event. For example, when a 'start' command is received or registered, TIE 106 may start impairing timestamps (e.g., generating and using a realistic DTE value) on the next packet to transmit (e.g., after the start command is registered). In another example, when a 'stop' command is received or registered, TIE 106 may enter a stopping state or mode. In this example, during the stopping mode, TIE 106 may utilize a non-sinusoidal formula for generating subsequent DTE values or related impaired timestamps, where the magnitude of each subsequent DTE value is reduced until the magnitude is zero, e.g., the non-sinusoidal or stopping state formula may yield DTE values where the magnitude of each generated DTE value is successively less than the magnitude of a previously generated DTE value. It will be appreciated that FIG. 3 is for illustrative purposes and that various details described above in relation to FIG. 3 may be changed or altered depending on settings, environments, embodiments, or other factors.

Figure 4:
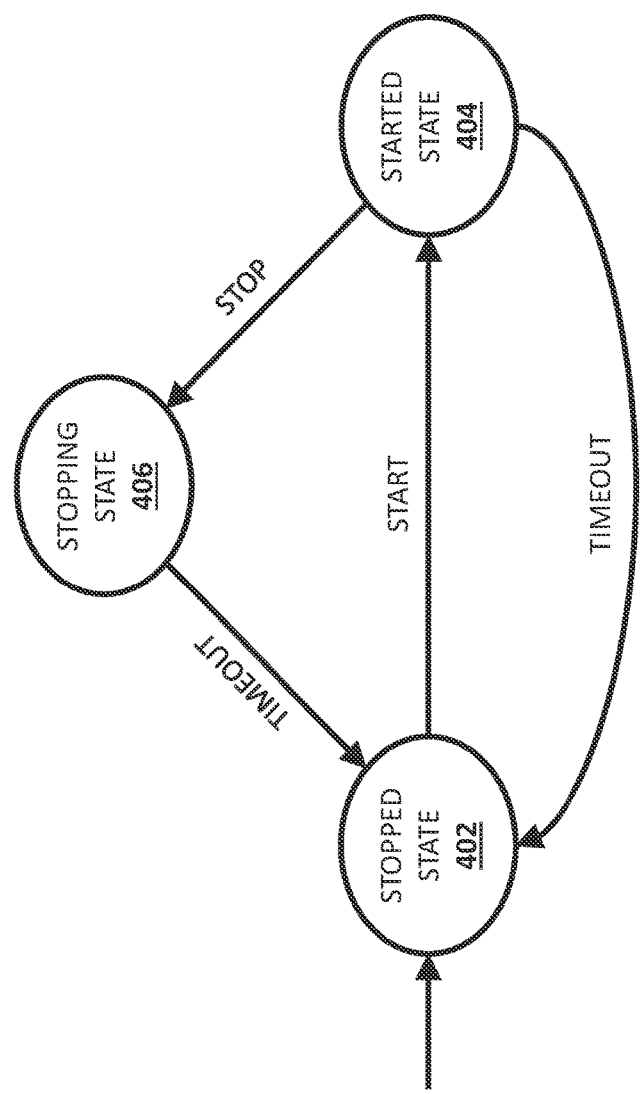
FIG. 4 is a diagram illustrating an example state machine representing various behaviors of a timestamp impairment engine.

FIG. 4 is a diagram illustrating an example state machine 400 representing various behaviors of TIE 106. Referring to FIG. 4, state machine 400 may include a stopped stated 402, a started state 404, and a stopping state 406. In some embodiments, state machine may include more or less processing states or modes, such as an initial state or configuration state, e.g., triggered by a 'configure' command from user 114.

In some embodiments, state machine 400 may represent different behaviors (e.g., states or characteristics thereof) associated with TIE 106 or a related entity caused by or triggered user-provided commands, such as a 'configure' command, a 'start' command, or a 'stop' command. For example, if TIE 106 is stopped or in stopped state 402 and user 114 issues a 'start' command to TIE 106 or a related entity (e.g., via an API or UI), started state 404 may occur.

In some embodiments, started state 404 may represent TIE 106 or another entity performing various behaviors, e.g., generating impaired timestamps and storing various statistics or data for test related purposes or other purposes. For example, in started state 404, TIE 106 or another entity may keep track of an impairment start time (e.g., a DTE generation start time) and may calculate an elapsed impairment time using the base timestamp input (e.g., from a clock or time source at test device 102). In this example, TIE 106 or another entity may also keep track of the most recently generated DTE value and/or historical DTE values.

In some embodiments, started state 404 may represent TIE 106 or another entity generating DTE values that follow a sine wave pattern over time. For example, in started state 404, TIE 106 or another entity may receive, via an API or UI, a base timestamp (e.g., the correct time or a non-impairment timestamp) to be impaired, and may return an impaired timestamp (e.g., a base timestamp +/−DTE).

In some embodiments, started state 404 may represent some behaviors of TIE 106 or another entity when triggering a new or different state, e.g., triggering stopped state 402 when an error event or another event occurs. For example, in started state 404, TIE 106 or another entity may detect an issue with TIE 106 or another entity (e.g., a base timestamp is not received within a particular time period) and in response to this issue or event, an error event (e.g., a timeout) may occur. In this example, the error event (e.g., a timeout) occurring may trigger stopped state 402. In another example, in started state 404, TIE 106 or another entity may detect a condition known as "return to zero is reached" and in response, this condition may trigger stopped state 402.

In some embodiments, stopping state 406 may be triggered by a 'stop' command from user 114 and may represent TIE 106 or another entity performing various behaviors, e.g., storing various statistics or data for test related purposes or other purposes. For example, in stopping state 406, TIE 106 or another entity may keep track of an impairment start time (e.g., a test start time or a DTE generation start time) and may calculate an elapsed impairment time using the base timestamp input (e.g., from a local master clock or a clock or time source). In this example, TIE 106 or another entity may keep track of the most recently generated DTE value and may use this value in computing subsequent DTE values (e.g., using a formula different from a sine wave based formula).

In some embodiments, stopping state 406 may represent or involve TIE 106 or another entity generating DTE values until the magnitude of the DTE values is zero. For example, in response to a receiving a 'stop' command and entering stopping state 406, TIE 106 or another entity may compute DTE values using a stopping state formula that reduces the magnitude of TE for each subsequently generated DTE value until the magnitude of TE is zero. It will be appreciated that stopping state 406 and related behaviors (e.g., continuing the test after a 'stop' command where timestamps are generated where the magnitude of DTE in each subsequent timestamp is reduced until the DTE is zero) allows a test session to "wind down" or stop in a controlled manner.

In some embodiments, stopping state 406 may be used to mitigate or avoid issues when an abrupt stop would cause testing and/or performance issues. For example, during a test session, if a timestamp impairment portion of the test session is stopped abruptly, then subsequent timestamps may be too different from the previously sent timestamps and may cause TDUT 112 to detect a loss of synchronization error and perform accordingly which could significantly impact testing of TDUT 112.

In some embodiments, stopping state 406 may represent some behaviors of TIE 106 or another entity when triggering a new or different state, e.g., triggering stopped state 402 when an error event or another event occurs. For example, in stopping state 406, TIE 106 or another entity may detect an issue with TIE 106 or another entity (e.g., a base timestamp is not received within a particular time period) and in response to this issue or event, an error event (e.g., a timeout) may occur. In this example, the error event (e.g., a timeout) occurring may trigger stopped state 402. In another example, in stopping state 406, TIE 106 or another entity may detect a condition known as "return to zero is reached" (e.g., as described above in FIG. 2) and in response, this condition may trigger stopped state 402.

In some embodiments, stopped state 402 may include or represent an initial state or a state after a configuration or initialization state (e.g., before a test session or timestamp impairment has started). In another example, stopped state 402 triggered by a 'stop' command from user 114 occurring after a "return to zero is reached" condition is reached while in stopping state 406.

In some embodiments, stopped state 402 may represent TIE 106 or another entity performing various behaviors, e.g., storing or clearing various statistics or data for test related purposes or other purposes. For example, in stopped state 406, TIE 106 or another entity may store statistics or other information in storage 110. In another example, TIE 106 or another entity may purge or delete stored data or a local memory used in DTE value generation. In some embodiments, stopped state 402 may represent some behaviors of TIE 106 or another entity when triggering a new or different state, e.g., triggering started state 404 when a 'start' command is received or another event occurs. For example, in stopped state 402, TIE 106 or another entity may receive a 'start' command and that may trigger started state 404.

In some embodiments, TIE 106 or a similar entity (e.g., a device or module with DTE and/or impaired timestamp generation functionality) may be configured using configuration information associated with a sine wave based formula, e.g., an amplitude value, a frequency value, and a duration of implementation (e.g., a number of sine wave cycles or a number of seconds).

In some embodiments, on start, TIE 106 or a similar entity may transition or move from an initial state (e.g., stopped state 402) to started state 404 and may wait for the next packet to transmit before generating an impaired timestamp (and/or calculating a DTE value) for that packet. In some embodiments, test settings may determine the time between test packets and the time may be predetermined or consistent, e.g., a timing packet may be sent every 500 milliseconds (ms) or test device 102 may be configured to send a 1000 timing packets per minute or parts per million (ppm).

In some embodiments, after a start command, a next packet to transmit may trigger an impairment calculation utilizing a sine wave based formula. For example, TIE 106 may utilize a sine wave based formula represented as DTE=amplitude*sin(2*pi*frequency*time_elapsed), where amplitude represents the amplitude of TE (e.g., a user provided input), frequency represents the frequency of TE impairment (e.g., a user provided input), and time_elapsed represents the amount time that has elapsed since the start of impairment (e.g., since a 'start' command was received or registered). Continuing with this example, since the time_elapsed value is zero for an initial packet after impairment is started (e.g., a 'start' command is sent and registered), the DTE value of the initial packet is zero, but that subsequent DTE values may range between the positive version of the amplitude value and the negative version of the amplitude value (e.g., if amplitude=3, then DTE values range between +3 and −3).

In some embodiments, upon reaching a predetermined duration of impairment (e.g., a pre-set number of cycles), TIE 106 or a similar entity may stop DTE generation or impairing timestamps. In such embodiments, by stopping when a pre-set number of cycles are completed, the DTE value may be zero in the last packet transmitted (e.g., see the expected impairment stop depicted in FIG. 3).

In some embodiments, if TIE 106 or a similar entity is stopped (e.g., via a 'stop' command) before a predetermined duration of impairment is reached, TIE 106 or a similar entity may transition or move from started state 404 to stopping state 406. For example, instead of stopping DTE calculation immediately when a 'stop' command is received and/or registered (which can cause a loss of synchronization error event at TDUT 112), TIE 106 or a similar entity may enter a 'stopping' mode and use a non-sinusoidal formula in generating DTE where the magnitude of DTE is reduced to zero in a controlled manner (e.g., using a stopping state formula that reduces the magnitude of TE for each subsequently generated DTE value until the magnitude of TE is zero).

In some embodiments, a stopping state formula may involve calculating and using a time to zero (TTZ) value which indicates the time needed or expected for the current magnitude of TE to reach zero. In some embodiments, a TTZ formula may be represented as TTZ=$DTE_F$/MAR, where $DTE_F$ represents an absolute value or magnitude of a most recently generated DTE value (e.g., from the most recent transmitted packet) when a "stop" command is received or registered and MAR represents a maximum adjustment ratio value that can be predetermined (e.g., by user 114) or derived based on test session settings and/or the capabilities of TDUT 112 (e.g., 1000 ppm).

In some embodiments, a stopping state formula may be represented as DTE=$DTE_F$*(1−t/TTZ), where t represents the time elapsed since a 'stop' command is received or registered. For example, assume that $DTE_F$ is 10 ms and TTZ is 5 ms, that a timing packet with an impaired transmit timestamp is sent every 1 ms, and that one second elapses before a timing packet is transmitted in stopping state 406, then five subsequent packets with diminishing DTE values may be generated before TIE 106 or a similar entity moves from stopping state 406 to stopped state 402. In this example, the DTE values (e.g., generated using the stopping state formula) for those five packets may be: 10*(1−(1/5))=8, 10*(1−(2/5))=6, 10*(1−(3/5))=4, 10*(1−(4/5))=2, and 10*(1−(5/5))=0.

It will be appreciated that FIG. 4 is for illustrative purposes and that various depicted messages, entities, behaviors, or details associated with TIE 106 described above with regard to FIG. 4 may be changed, altered, added, or removed.

Figure 5:
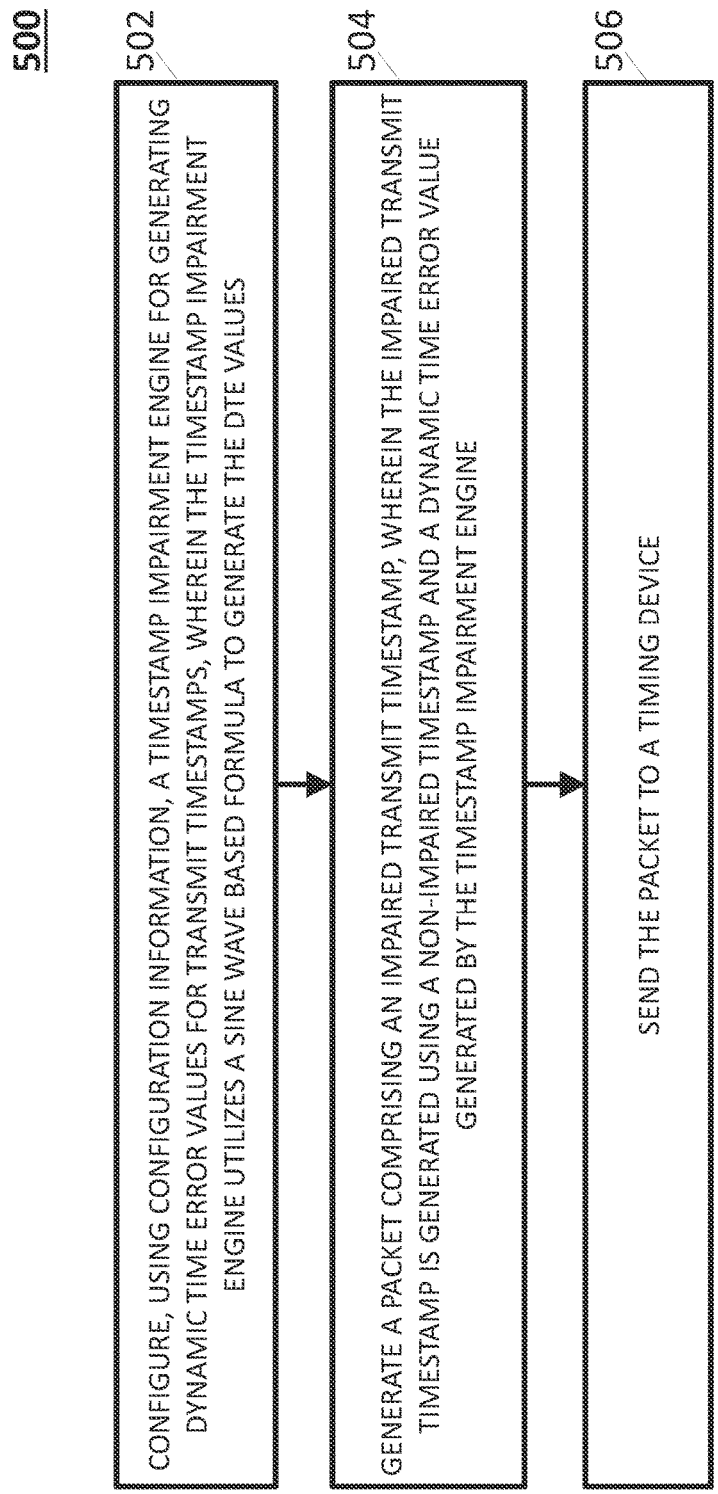
FIG. 5 is a flow chart illustrating an example process for generating DTE.

FIG. 5 is a diagram illustrating an example process 500 for generating DTE. In some embodiments, process 500, or portions thereof, may be performed by or at test device 102, CTC 104, TIE 106, and/or another node or module. For example, process 500 may be performed by or at test device 102, CTC 104, TIE 106, or another node or module. In some embodiments, process 500 may include steps 502, 504, and/or 506.

Referring to process 500, in step 502, TIE 106 or another entity for generating DTE values for transmit timestamps may be configured using configuration information. In some embodiments, TIE 106 or a similar entity may utilize a sine wave based formula to generate DTE values.

In step 504, a packet comprising an impaired transmit timestamp may be generated. In some embodiments, an impaired transmit timestamp may be generated using a non-impaired timestamp (e.g., from a clock or time source or an emulation thereof) and a DTE value (e.g., generated by TIE 106), e.g., timestamp+DTE=impaired timestamp. In some embodiments, an impaired transmit timestamp may be generated using a non-impaired timestamp (e.g., from a clock or time source or an emulation thereof) and a DTE value (e.g., generated by TIE 106) and a user provide CTE value, e.g., timestamp+CTE+DTE=impaired timestamp.

In step 506, the fist packet may be sent to a timing device (e.g., TDUT 112). For example, a packet sent to TDUT 112 from test device 102 may include a timing synchronization related message, e.g., a PTP Synch message, a PTP Follow_Up message, or a Delay_Resp message, or another message.

In some embodiments, process 500 may include analyzing performance of the timing device; and reporting test results to a test operator (e.g., user 114) or a test system.

In some embodiments, analyzing performance of a timing device may include receiving and analyzing a response message associated with a packet (e.g., from TDUT 112); or analyzing a packet log or a timing data log associated with the timing device.

In some embodiments, DTE values may be sinusoidal over a period of time, where each of the DTE values may be between negative and positive configurable limits. For example, over a period of time, TIE 106 may generate DTE values that match a sine wave pattern, e.g., based on customizable user input like amplitude, frequency, a number of cycles (or a length of time). In this example, a generated DTE value may range between a positive and a negative limit (e.g., configurable or based on a user provided amplitude of a sine wave) and changes at a rate (e.g., configurable or based on a user provided frequency of the sine wave). In some embodiments, a generated DTE value may be combined with a fixed offset or a CTE to generate a realistic TE.

In some embodiments, e.g., where TIE 106 utilizes a sine wave based formula to generate DTE values, the sine wave based formula may include a frequency value, an amplitude value, and a time elapsed value. In such embodiments, configuration information for configuring TIE 106 (e.g., from user 114 or another source) may indicate the frequency value, the amplitude value, and a stop condition.

In some embodiments, prior to a preconfigured stop condition being met (e.g., a user-inputted number of cycles or number of seconds), TIE 106 may be configured for receiving a stop command for stopping TIE 106; after receiving the stop command, entering a stopping mode (e.g., stopping state 406); and during the stopping mode, utilizing a second formula (e.g., a stopping state formula) that reduces the magnitude of TE for each subsequently generated DTE value until the magnitude of TE may be zero.

In some embodiments, entering a stopping mode may comprise determining a return to zero error time value (e.g., a TTZ value) using a most recently generated DTE value prior to receiving the stop command (e.g., a $DTE_F$) divided by a maximum adjustment value (e.g., a MAV).

In some embodiments, prior to using configuration information (e.g., to configure TIE 106), validating the configuration information may occur. For example, validating configuration information may be for ensuring that an initial DTE value and subsequent DTE values generated during the testing will not result in a loss of synchronization error at the timing device. In this example, validating configuration information may include validating that an amplitude value and a frequency value for a sine wave based formula used in generating DTE value. Continuing with this example, assuming that the sine wave based formula being utilized is DTE=amplitude*sin(2*pi*frequency*time_elapsed), validating user provided amplitude and frequency value may involve determining that the product of the amplitude and frequency value is less than the reciprocal of the product of two*pi, e.g., (1/(2*pi)).

It will be appreciated that process 500 is for illustrative purposes and that different and/or additional actions may be used. It will also be appreciated that various actions described herein may occur in a different order or sequence.

It should be noted that test system 100, test device 102, CTC 104, TIE 106, and/or functionality described herein may constitute a special purpose computing device. Further, test system 100, test device 102, CTC 104, TIE 106, and/or functionality described herein can improve the technological field of testing timing devices. For example, test device 102 or a related entity (e.g., TIE 106) to generate transmit packet timestamps that exhibit realistic DTE (e.g., DTE that varies over time in a sinusoidal pattern). As such, test device 102 or a related entity (e.g., TIE 106) can emulate realistic timestamp impairment patterns (e.g., seen in network clocks) and/or may facilitate realistic testing of TDUT 112, thereby allowing realistic testing resiliency or other aspects of timing devices.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating DTE, the method comprising:
at a test device for testing a timing device:
    configuring, using configuration information, a timestamp impairment engine for generating DTE values for transmit timestamps, wherein the timestamp impairment engine utilizes a sine wave based formula to generate the DTE values;
    generating a packet comprising an impaired transmit timestamp, wherein the impaired transmit timestamp is generated using a non-impaired timestamp and a DTE value generated by the timestamp impairment engine;
    sending the packet to the timing device;
    analyzing performance of the timing device, wherein analyzing the performance of the timing device includes receiving and analyzing a response message associated with the packet; or analyzing a packet log or a timing data log associated with the timing device; and
    reporting test results to a test operator or a test system.

2. The method of claim 1 wherein the sine wave based formula includes a frequency value, an amplitude value, and a time elapsed value.

3. The method of claim 2 wherein the configuration information indicates the frequency value, the amplitude value, the time elapsed value, or a stop condition.

4. The method of claim 1 comprising:
at the timestamp impairment engine:
    prior to a preconfigured stop condition being met, receiving a stop command for stopping the timestamp impairment engine;
    after receiving the stop command, entering a stopping mode; and
    during the stopping mode, utilizing a second formula that reduces the magnitude of time error for each subsequently generated DTE value until the magnitude of time error is zero.

5. The method of claim 4 wherein entering the stopping mode comprises determining a return to zero error time value using a most recently generated DTE value prior to receiving the stop command divided by a maximum adjustment value.

6. The method of claim 1 comprising:
prior to using the configuration information, validating the configuration information for ensuring that the DTE value and subsequent DTE values generated during the testing will not result in a loss of synchronization error at the timing device.

7. A method for generating DTE, the method comprising:
at a test device for testing a timing device:
    configuring, using configuration information, a timestamp impairment engine for generating DTE values for transmit timestamps, wherein the timestamp impairment engine utilizes a sine wave based formula to generate the DTE values, wherein the DTE values are sinusoidal over a period of time, wherein each of the DTE values is between negative and positive configurable limits;
    generating a packet comprising an impaired transmit timestamp, wherein the impaired transmit timestamp is generated using a non-impaired timestamp and a DTE value generated by the timestamp impairment engine; and
    sending the packet to the timing device.

8. A system for generating DTE, the system comprising:
at least one processor;
a memory; and
a test device for testing a timing device, wherein the test device is implemented using the at least one processor and the memory, the test device configured for:
    configuring, using configuration information, a timestamp impairment engine for generating DTE values for transmit timestamps, wherein the timestamp impairment engine utilizes a sine wave based formula to generate the DTE values;
    generating a packet comprising an impaired transmit timestamp, wherein the impaired transmit timestamp is generated using a non-impaired timestamp and a DTE value generated by the timestamp impairment engine;

sending the packet to the timing device;
analyzing performance of the timing device, wherein analyzing the performance of the timing device includes receiving and analyzing a response message associated with the packet; or analyzing a packet log or a timing data log associated with the timing device; and
reporting test results to a test operator or a test system.

9. The system of claim 8 wherein the timestamp impairment engine utilizes a sine wave based formula to generate the DTE values, wherein the sine wave based formula includes a frequency value, an amplitude value, and a time elapsed value.

10. The system of claim 9 wherein the configuration information indicates the frequency value, the amplitude value, the time elapsed value, or a stop condition.

11. The system of claim 8 wherein the timestamp impairment engine is configured for:
prior to a preconfigured stop condition being met, receiving a stop command for stopping the timestamp impairment engine;
after receiving the stop command, entering a stopping mode; and
during the stopping mode, utilizing a second formula that reduces the magnitude of time error for each subsequently generated DTE value until the magnitude of time error is zero.

12. The system of claim 11 wherein the stopping mode is utilized for ensuring that the stop command does not trigger a loss of synchronization error at the timing device.

13. The system of claim 11 wherein entering the stopping mode comprises determining a return to zero error time value using a most recently generated DTE value prior to receiving the stop command divided by a maximum adjustment value.

14. The system of claim 8 wherein the test device is configured for:
prior to using the configuration information, validating the configuration information for ensuring that the DTE value and subsequent DTE values generated during the testing does not trigger a loss of synchronization error at the timing device.

15. A system for generating DTE, the system comprising:
at least one processor;
a memory; and
a test device for testing a timing device, wherein the test device is implemented using the at least one processor and the memory, the test device configured for:
configuring, using configuration information, a timestamp impairment engine for generating DTE values for transmit timestamps, wherein the timestamp impairment engine utilizes a sine wave based formula to generate the DTE values, wherein the DTE values are sinusoidal over a period of time, wherein each of the DTE values is between negative and positive configurable limits;
generating a packet comprising an impaired transmit timestamp, wherein the impaired transmit timestamp is generated using a non-impaired timestamp and a DTE value generated by the timestamp impairment engine; and
sending the packet to the timing device.

16. A non-transitory computer readable medium having stored thereon executable instructions that when executed by at least one processor of at least one computer cause the at least one computer to perform steps comprising:
configuring, using configuration information, a timestamp impairment engine for generating DTE values for transmit timestamps, wherein the timestamp impairment engine utilizes a sine wave based formula to generate the DTE values;
generating a packet comprising an impaired transmit timestamp, wherein the impaired transmit timestamp is generated using a non-impaired timestamp and a DTE value generated by the timestamp impairment engine;
sending the packet to a timing device;
analyzing performance of the timing device, wherein analyzing the performance of the timing device includes receiving and analyzing a response message associated with the packet; or analyzing a packet log or a timing data loq associated with the timing device; and
reporting test results to a test operator or a test system.

* * * * *

UNITED STATES PATENT AND TRADEMARK OFFICE
CERTIFICATE OF CORRECTION

PATENT NO. : 12,113,886 B2
APPLICATION NO. : 18/105231
DATED : October 8, 2024
INVENTOR(S) : Jeeyan Sanyal et al.

It is certified that error appears in the above-identified patent and that said Letters Patent is hereby corrected as shown below:

In the Claims

In Column 14, Line 40, in Claim 16, delete "loq" and insert -- log --.

Signed and Sealed this
Nineteenth Day of August, 2025

Coke Morgan Stewart
*Acting Director of the United States Patent and Trademark Office*